(12) United States Patent
Leiber et al.

(10) Patent No.: US 6,714,437 B1
(45) Date of Patent: Mar. 30, 2004

(54) DATA MEMORY AND METHOD FOR WRITING INFORMATION IN A DATA MEMORY

(75) Inventors: Jörn Leiber, Heiligenstedtenerkamp (DE); Bernhard Mussig, Seevetal (DE); Stefan Stadler, Hamburg (DE)

(73) Assignee: Tesa AG, Hamburg (DE)

( * ) Notice: Subject to any disclaimer, the term of this patent is extended or adjusted under 35 U.S.C. 154(b) by 0 days.

(21) Appl. No.: 10/048,122

(22) PCT Filed: May 23, 2000

(86) PCT No.: PCT/EP00/04667
§ 371 (c)(1),
(2), (4) Date: Mar. 26, 2002

(87) PCT Pub. No.: WO01/08141
PCT Pub. Date: Feb. 1, 2001

(30) Foreign Application Priority Data
Jul. 26, 1999 (DE) .......................................... 199 35 775

(51) Int. Cl.[7] .............................................. G11C 13/00
(52) U.S. Cl. ........................ 365/151; 365/106; 365/215
(58) Field of Search ................................. 365/151, 106, 365/215; 235/487, 449, 454

(56) References Cited

U.S. PATENT DOCUMENTS

| | | | |
|---|---|---|---|
| 4,837,745 A | * 6/1989 | Eich et al. ................. | 365/108 |
| 5,049,462 A | * 9/1991 | Funhoff et al. ............ | 365/215 |
| 5,289,407 A | 2/1994 | Strickler et al. | |
| 5,627,817 A | 5/1997 | Rosen et al. | |
| 5,800,950 A | 9/1998 | Hirao et al. | |
| 6,236,589 B1 | * 5/2001 | Gupta et al. ............... | 365/151 |
| 6,386,458 B1 | * 5/2002 | Leiber et al. .............. | 235/487 |
| 6,450,642 B1 | * 9/2002 | Jethmalani et al. ........ | 351/219 |

FOREIGN PATENT DOCUMENTS

| | | |
|---|---|---|
| EP | 0 352 194 A | 1/1990 |
| EP | 0 352 194 | 1/1990 |
| WO | 00 17864 A | 3/2000 |
| WO | 00/17864 | 3/2000 |

OTHER PUBLICATIONS

CHIP Das Computer–Magazin Sep. 8, 1998 Chip 8 and 9.

* cited by examiner

Primary Examiner—Huan Hoang
(74) Attorney, Agent, or Firm—Nixon & Vanderhye PC

(57) ABSTRACT

In a method of writing information in a data storage medium comprising an optical information medium which has a polymer carrier (1), atoms and/or molecules (4) that change the refractive index are introduced into the polymer carrier (1), at individual locations associated with information units, as a function of the information to be entered.

30 Claims, 1 Drawing Sheet

DATA MEMORY AND METHOD FOR WRITING INFORMATION IN A DATA MEMORY

Figure 1:
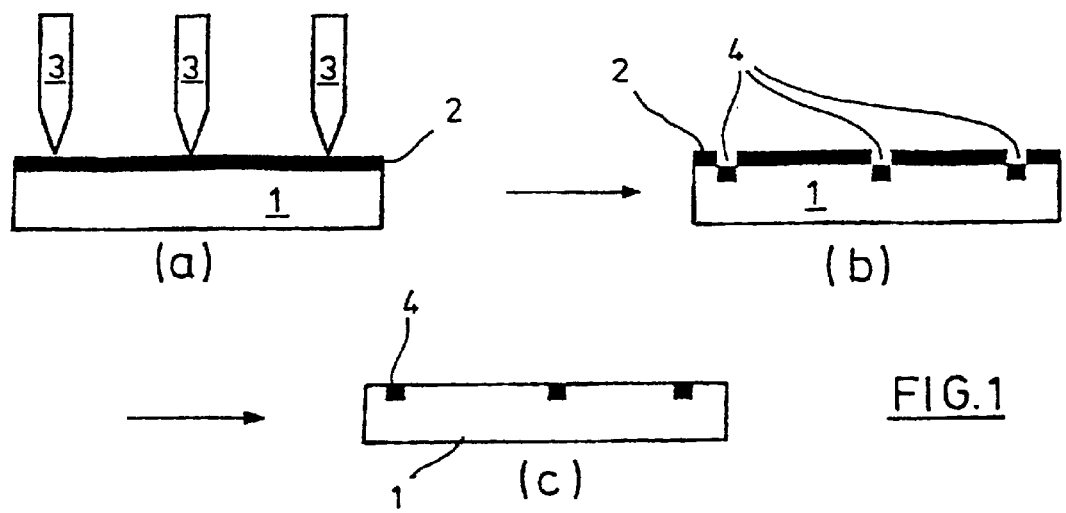

This application is the US national phase of international application PCT/EP00/04667 file May 23, 2000, which designated the US.

The invention relates to a method of writing information in a data storage medium comprising an optical information medium, and also a data storage medium.

DE 298 16 802 describes a data storage medium comprising an optical information medium which contains a polymer carrier in the form of a polymer film. Cited as a material for the polymer film is polymethyl methacrylate, and also a polymer film which is marketed by Beiersdorf AG under the designation "crystal-clear Tesafilm", which has biaxially oriented polypropylene. In the case of this data storage medium, the polymer film is wound spirally in a plurality of plies on to a winding core, there being an adhesion layer in each case between adjacent plies. Information can be written in the data storage medium by the polymer film being heated locally with the aid of a write beam from a data drive. This is because the energy stored in the polypropylene as a result of biaxial stretching during film production is liberated again during the local heating by the write beam (short laser pulses), the polymer film material contracting locally and therefore changing its refractive index at those locations exposed to the write beam. This leads to a local change in the reflective power (the reflectivity) at the interface of the polymer film, which can be registered with the aid of a read beam in the data drive. By means of focusing the write beam or read beam, information can be written specifically into a preselected ply of the information medium or can be read out from it. The winding core can be optically transparent and, at its center, have a recess, which is used to accommodate the writing and reading device of a data drive. In this case, the writing and reading device is moved relative to the data storage medium, while the data storage medium is stationary, so that the data storage medium need not be balanced to take account of rapid rotational motion.

In order to convert the output of the write beam effectively into heat and, in this way, to achieve a local change in the refractive index of the order of magnitude of 0.2, which is sufficient to store information, an absorber, which is contained in the adhesion layer, is used in the data storage medium previously disclosed. However, the absorber is disadvantageous, since it also attenuates the read beam. This has a disruptive effect, in particular in the case of multi-ply systems like the data storage medium previously disclosed. In addition, it is desirable for the achievable change in the refractive index to be still greater, in order to obtain a stronger signal from the read beam.

It is an object of the invention to provide improved options for a data storage medium comprising an optical information medium which has a polymer carrier.

This object is achieved by a method of writing information in a data storage medium comprising an optical information medium having the features of claim 1, and also by data storage media having the features of claims 11 and 12. Advantageous refinements of the invention emerge from the dependent claims.

The method according to the invention is used to write information in a data storage medium comprising an optical information medium which has a polymer carrier. In this case, atoms and/or molecules that change the refractive index are introduced into the polymer carrier, at individual locations associated with information units, as a function of the information to be entered.

The atoms and/or molecules that change the refractive index and are located in the area of the polymer carrier envisaged for the storage of an information unit effect a change in the refractive index. The result of this is a local change in the reflective power (the reflectivity) at the interface or at the interfaces of the polymer carrier with an adjacent medium. This can be registered with the aid of a read beam which, at the location considered, is reflected as a function of the information entered, that is to say the local content of atoms and/or molecules that change the refractive index. As a result of introducing the atoms and/or molecules that change the refractive index into the polymer carrier, the optical properties of the polymer carrier can be changed effectively and in a defined way. For example, local changes in refractive index of the order of magnitude of 0.2 and more may be achieved, which is sufficient for the data entered to be read out, for example with the aid of a read beam. A suitable polymer carrier is, for example, a polymer film.

In the polymer carrier, the information units are formed by changing the optical properties in an area having a preferred size of less than 1 $\mu$m. Here, the information can be stored in a binary form, that is to say at the location of an information unit, the local reflectivity assumes only two values. In other words, if the reflectivity is above a defined threshold value, a "1", for example, is stored at the considered location on the information medium and if it lies below this threshold value or below a different, lower threshold value, it is accordingly a "0". However, it is also conceivable to store the information in a plurality of gray stages. This is possible if the optical properties of the polymer carrier, at the location of an information unit, can be changed in a specific way by means of defined setting of the refractive index without saturation being reached in the process.

In an advantageous refinement of the method according to the invention, the atoms and/or molecules that change the refractive index are diffused into the polymer carrier, to be specific, preferably by means of local heating. In this case, the atoms and/or molecules that change the refractive index can originate from a layer which is applied to the polymer carrier. In order to introduce the atoms and/or molecules that change the refractive index into the polymer carrier at the location of an information unit, the layer or the polymer carrier adjacent thereto is heated in the relevant area, so that the atoms and/or molecules that change the refractive index can migrate out of the layer and diffuse into the polymer carrier. Since no atoms and/or molecules that change the refractive index diffuse into the polymer carrier from adjacent areas which are not heated, in this way a two-dimensional distribution of atoms and/or molecules that change the refractive index can be arranged in the polymer carrier, said distribution corresponding to the pattern of the information to be entered.

If the rest of the layer from which the atoms and/or molecules that change the refractive index originate, is removed from the polymer carrier after the information has been entered, the signals registered by a read beam are particularly clear, since the atoms and/or molecules that change the refractive index are virtually all located in the polymer carrier. It is not therefore possible for any disruptive influence to originate from atoms and/or molecules which change the refractive index in the rest of the layer.

After the rest of the layer has been removed, however, no new or further information can be written in the data storage medium. However, it is not absolutely necessary to remove the rest of the layer from the polymer carrier after information has been entered. This is because the atoms and/or molecules that change the refractive index have, in the molecular surroundings of the polymer carrier, different optical properties than in the layer in which they are generally stored in a higher concentration and, depending on the embodiment, in a matrix. However, a part is also played by the interface between the polymer carrier and the interface of the polymer carrier opposite the layer, whose reflectivity is predominantly influenced by the atoms and/or molecules that change the refractive index and have diffused into the polymer carrier, and not by the rest of the layer located on the other side of the polymer carrier.

One other possible way of introducing the atoms and/or molecules that change the refractive index into the polymer carrier is to implant them into the polymer carrier by means of particle beams.

The information to be entered can be entered, for example, by means of a focused write beam. For example, a focused laser beam may be used as a write beam, which locally heats a layer applied to the polymer carrier and comprising atoms and/or molecules that change the refractive index, so that atoms and/or molecules that change the refractive index diffuse from there into the polymer carrier. In addition, in the case of an implantation method, a particle beam may also be used as a write beam.

One other possible way of writing the polymer carrier is to enter the information to be entered over a large area, using a mask. In this case, the polymer carrier can be placed behind a mask, which is provided with a pattern in accordance with the information to be entered. Located in front of the mask is a source, for example a thermal radiation source or a light source, whose radiation penetrates in accordance with the pattern on the mask as far as the polymer carrier or a layer comprising atoms and/or molecules that change the refractive index on the polymer carrier, or a source of particle radiation, in order to implant atoms and/or molecules that change the refractive index into the polymer carrier in accordance with the pattern on the mask.

In an advantageous refinement of the method according to the invention, the information to be entered is entered by means of irradiation with infrared light, for example by using a write beam or a mask, as already mentioned. The infrared light (thermal radiation) aimed at the area for the storage of an information unit effects local heating, which leads to diffusion of atoms and/or molecules that change the refractive index into the polymer carrier. Infrared light in the wavelength range around 1.5 $\mu$m is particularly suitable, since the material of the polymer carrier (for example polypropylene, see below) specifically generally exhibits relatively high absorption there, which is caused by harmonics in the C-H stretching vibrations.

Conceivable atoms and/or molecules that change the refractive index are a large number of different atoms and/or molecules. The selection depends, for example, on the compatibility with the polymer carrier, the magnitude of the effect to be achieved, (that is to say the desired change in the refractive index), the optical properties in the spectral range of the read beam used to read the information, and so on.

It is particularly advantageous to use highly polarizable molecules as atoms and/or molecules that change the refractive index. They have a relatively high refractive index and therefore influence the optical properties of the polymer carrier relatively strongly if they are introduced there.

Particularly suitable highly polarizable molecules are halogen-containing molecules. For example, chlorine and bromine, with their high polarizability, increase the refractive index. Halogen-containing materials considered for a layer comprising molecules that change the refractive index and applied to the polymer carrier are, in particular, resins and oligomers. In the range of acrylates, in particular, there exists a large number of commercially obtainable, partially or completely halogenized monomers.

In addition, aromatic molecules may be used as highly polarizable molecules. The refractive index of hydrocarbons can be set by the aromaticity; aromatics have considerably higher refractive indices than saturated hydrocarbons. Particularly large effects may be achieved with halogen-containing aromatic molecules.

Another possibility is to use slightly polarizable molecules as atoms and/or molecules that change the refractive index, that is to say molecules which, as compared with the polymer carrier, have a low polarizability and therefore a low refractive index. This is because such molecules also exhibit a relatively intense action on the optical properties of the polymer carrier, if they are introduced there to store information. For example, the refractive index of a medium decreases if hydrogen therein is replaced by fluorine.

The method according to the invention of writing information in a data storage medium may be implemented in a particularly advantageous way in connection with two types of data storage media.

One type of data storage medium according to the invention has an optical information medium with information that has already been entered and has a polymer carrier. In this case, the polymer carrier contains atoms and/or molecules that change the refractive index at individual locations associated with information units, as a function of the entered information. The data storage medium can be written by the manufacturer in one of the ways explained above. In this case, if the atoms and/or molecules that change the refractive index were diffused into the polymer carrier from a layer applied to the polymer carrier, and this layer was subsequently removed, no new or further information can be entered into the data storage medium by the user, at least not in accordance with the method according to the invention.

The second type of data storage medium according to the invention has an optical information medium which has a polymer carrier, the polymer carrier being provided with a layer which contains atoms and/or molecules that change the refractive index. These can be diffused into the polymer carrier by local heating. A data storage medium of this type can therefore be written by the user; however, the data or part of the data can also already have been entered by the manufacturer.

The atoms and/or molecules that change the refractive index preferably comprise highly polarizable molecules, such as halogen-containing molecules or aromatic molecules but also slightly polarizable molecules, as explained above.

If the polymer carrier is provided with a layer which contains atoms and/or molecules that change the refractive index, then in a preferred refinement, an absorber is assigned to the layer and is set up to absorb a write beam, at least partly, and to locally discharge, at least partly, the heat produced in the process to the layer and/or the polymer carrier. For example, the absorber can be contained in the layer, in the polymer carrier or in an adhesion layer adjacent to the polymer carrier. It makes easier the absorption of a write beam and therefore the local heating required for the diffusion of the atoms and/or molecules that change the refractive index. Alternatively, (or else additionally), the heating can also be carried out by means of irradiation with infrared light, for example in the wavelength range around 1.5 μm, as already explained. This is because a polymer carrier, for example one made of polypropylene, has a relatively high absorption, caused by harmonics of the C-H stretching vibrations. Therefore, it may be possible to dispense with an additional absorber.

The information medium preferably has a plurality of polymer carrier plies, through which information units can be read from a preselected polymer carrier ply and, if appropriate, written to a preselected polymer carrier ply. In each case an adhesion layer can be arranged between adjacent polymer carrier plies, in order to fix the polymer carrier plies to one another. Suitable adhesion means are, for example, an air-bubble free acrylate adhesive which, for example, is crosslinked chemically or by means of UV or electron radiation. If the refractive index of the adhesion layer differs only slightly from the refractive index of the polymer carrier, disruptive reflections of a read beam or write beam at an interface between a polymer carrier ply and an adjacent adhesion layer are minimized. It is particularly advantageous if the difference in the refractive indices is less than 0.005. However, an existing difference in the refractive indices can be used to format the data storage medium. It is conceivable for a layer which contains atoms and/or molecules that change the refractive index to have adhesive properties (see above), so that an additional adhesion layer can be dispensed with.

Plate material can be used as the polymer carrier. However, the polymer carrier may also have a polymer film, for example made of a biaxially oriented polypropylene (BOPP). If a polymer film is used as the polymer carrier, then in a preferred embodiment, the information medium is wound on spirally, an adhesion layer preferably being provided in each case between adjacent polymer film plies. For example, 10 to 30 polymer film plies can be wound on but also more or fewer. Given a thickness of the polymer film between 10 μm and 100 μm, preferably below 50 μm or around 35 μm, the information on different polymer film plies can be mutually separated with good resolution, with the aid, for example, of reading and writing devices known from DVD technology. An adhesion layer can, for example have a thickness in the range between 1 μm and 40 μm, preferably below 25 μm or around 2 μm.

The data storage medium comprising a spiral-wound information medium preferably has an optically transparent winding core which has a recess in its central area. In this case, it is possible to arrange a reading device and, optionally, a writing device of a drive tuned to the data storage medium in the recess in the central area of the winding core, and, in order to read or write information, to move it relative to the data storage medium, while the data storage medium is stationary. A stationary data storage medium has the advantage that it does not have to be balanced in order to permit high rotational speeds, which has a beneficial effect on the manufacturing costs.

Figure 2:
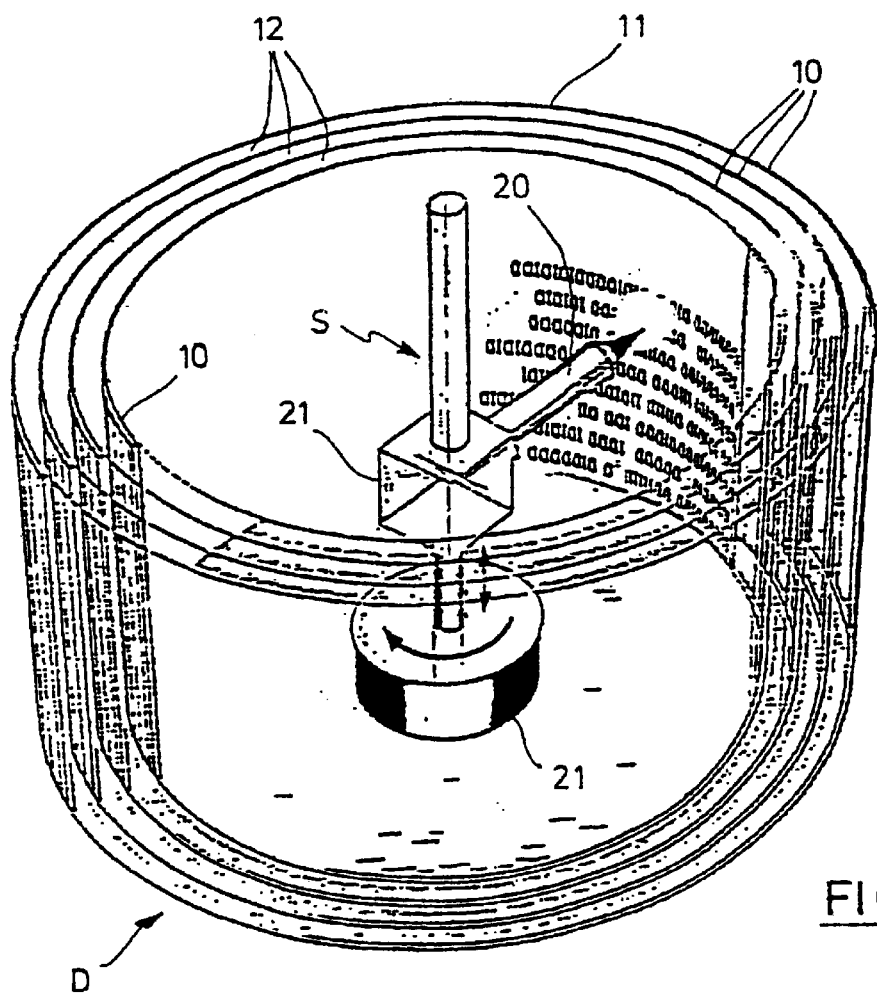

In the following text, the invention will be described in more detail by using exemplary embodiments. In the drawings:

FIG. 1 shows, in the parts (a), (b) and (c), schematic representations of various steps during the implementation of the method according to the invention of writing information in a data storage medium comprising an optical information medium, and FIG. 2 shows a schematic perspective illustration of a data storage medium according to the invention which has an information medium wound spirally on to a winding core, parts of a drive tuned to the data storage medium being arranged within the winding core.

FIG. 1 illustrates various steps in an exemplary embodiment of a method of writing information in a data storage medium comprising an optical information medium.

The optical information medium has a polymer carrier 1, which can be configured as a polymer film. Applied to he polymer carrier 1 is a thin layer 2, which contains atoms and/or molecules that change the refractive index. In this case, the atoms and/or molecules that change the refractive index can make up the entire layer 2, but can also be embedded in a matrix of a carrier material.

FIG. 1(a) shows how the layer 2 with the polymer carrier 1 located underneath it is locally heated at three different locations with the aid of a focused laser beam 3 serving as a write beam. In this case, the size of a heated area corresponds approximately to the size which is envisaged for the storage of an information unit. The focus of the write beam 3 typically has a size (for example diameter or side length, depending on the geometric shape of the focus) of about 1 μm or less. In order to carry out the heating at the three locations shown in FIG. 1(a), the write beam 3 can be aimed at the three locations one after another. However, the simultaneous heating of all three locations is also conceivable, which can be achieved for example by using a plurality of write beams, by irradiating a mask or by projecting an image corresponding to the desired heating pattern on to the layer 2.

Because of the local heating, at the three locations considered, atoms and/or molecules that change the refractive index diffuse out of the layer 2 into the polymer carrier 1, which is illustrated in FIG. 1(b). The locations of the polymer carrier 1 with an increased concentration of atoms and/or molecules that change the refractive index are designated by 4 in FIG. 1(b). In these areas, the polymer carrier 1 has a changed refractive index, which leads to a change in the reflectivity at the interfaces of the polymer carrier 1 and can be registered by a read beam in a drive tuned to the data storage medium.

FIG. 1(c) shows, as a further step in the method, that the rest of the layer 2 is removed, for example with the aid of a solvent or etching medium, after the information has been entered. In this case, the atoms and/or molecules that change the refractive index are able to show an effect only at the locations on the polymer carrier 1 that are associated with the individual information units, and only in accordance with the entered information content, which makes possible a read signal that is easy to register.

However, the method step illustrated in FIG. 1(c) can also be dispensed with, so that the rest of the layer 2 remains on the polymer carrier 1. This is because the optical properties of the polymer carrier 1 are changed, by the inward diffusion of the atoms and/or molecules that change the refractive index at the locations exposed to the write beams 3, to a sufficient extent that a difference from other locations can still be registered with the aid of a reading device. This variant of the method has the advantage that a data storage medium, in which the layer 2 remains on the polymer carrier 1, can also be written by a user with the aid of an inexpensive data drive. This also applies to the case in which the data storage medium has a plurality of plies of a polymer carrier 1 provided with a layer 2, as explained in more detail below using FIG. 2.

Suitable atoms and/or molecules that change the refractive index are, in particular, highly polarizable molecules such as halogen-containing molecules, aromatics or aromatic halogen-containing molecules. Because of the generally high polarizability, the refractive index is high in these cases. The following table shows the refractive index n in the light of the sodium-D line at 20° C. for some compounds which are present in liquid form.

| Compound | n |
|---|---|
| Benzene | 1.504 |
| Fluorobenzene | 1.468 |
| Chlorobenzene | 1.524 |
| Bromobenzene | 1.561 |
| 1,2 Difluorobenzene | 1.445 |
| Perfluorobenzene | 1.378 |
| 1,2 Dichlorobenzene | 1.552 |
| 1,2 Dibromobenzene | 1.616 |
| Cyclohexane | 1.427 |
| Fluorocyclohexane | 1.415 |
| Chlorocyclohexane | 1.463 |
| Bromocyclohexane | 1.496 |
| 1,2-cis dichlorocyclohexane | 1.497 |
| 1,2-cis dibromocyclohexane | 1.551 |

Halogen-containing materials considered are, in particular, resins and oligomers. For example, in the range of acrylates, a multiplicity of partially and completely halogenated monomers can be obtained commercially.

There follow some examples of materials for the polymer carrier 1 and further examples of molecules that change the refractive index in the layer 2.

The polymer carrier can comprise a polymer film made of biaxially oriented polypropylene (BOPP) or polyethylene terephthalate (PET). However, polymer films made of non-stretched material are also conceivable, since the introduction of the information is based on a different principle to that mentioned in DE 298 16 802 mentioned at the beginning. For example, films made of polymethyl methacrylate (PMMA), COC (a cycloolefinic copolymer marketed by Hoechst), or a material marketed by Nippon Zeon under the designation Zeonex can be used. The last three materials are completely amorphous (that is to say they contain no cystallites) and are therefore very transparent. One advantage of PMMA, in addition to a favorable price, is its chemical relationship with halogenated acrylate coatings, which can be applied as a layer having molecules that change the refractive index. By contrast, COC and Zeonex exhibit increased temperature stability. For example, the glass transition temperatures are about 105° C. for PMMA, about 135° C. for COC and about 135° C. for Zeonex.

Advantageous materials for the layer with atoms and/or molecules that change the refractive index are, for example, chlorinated or brominated methacrylates or acrylates, in particular if they are already somewhat grafted, therefore as oligomers, as they are called, for example pentabromophenyl acrylate and pentabromophenyl methacrylate. The latter compounds also contain an aromatic phenyl group in addition to the bromine. If a local reduction in refractive index is desired as the optical effect for storing information, appropriately fluorinated methacrylates or acrylates can be employed, for example pentadecafluoroctyl acrylate or pentadecafluoroctyl methacrylate. Also conceivable are epoxy resins which, for example, are produced from 2,2', 6,6' tetrabromobisphenol A and an epoxy component, for example epichlorohydrin.

FIG. 2 shows a schematic illustration of a data storage medium D and a reading and writing device S of a drive tuned to the data storage medium D. The data storage medium D has a number of plies 10 of a polymer film 11 which serves as the information medium and to which there is applied a layer which contains molecules that change the refractive index, not shown separately in FIG. 2. The polymer film 11 having the aforementioned layer is wound spirally on to an optically transparent, sleeve-like winding core. For clarity, the winding core is not illustrated in FIG. 2; it is located within the innermost ply 10. For the purpose of better illustration, the individual plies 10 of the polymer film 11, including the layer with molecules that change the refractive index, are shown in FIG. 2 as concentric circular rings, although the plies 10 are formed by means of spiral winding of the coated polymer film 11. In each case, an adhesion layer 12 is arranged between adjacent plies 10 of the coated polymer film 11. For reasons of clarity, the adhesion layers 12 are shown in FIG. 2 with an enlarged thickness, not to scale.

The polymer film 11 itself in the exemplary embodiment consists of biaxially oriented polypropylene (BOPP) and has been prestressed in both surface directions before being wound. In the exemplary embodiment, it has a thickness of 35 μm; other thicknesses in the range from 10 μm to 100 μm or even thicknesses lying outside this range are likewise conceivable. The layer with molecules that change the refractive index on the polymer film 11 has a thickness of 1 μm in the exemplary embodiment, other thicknesses also being possible. In the exemplary embodiment, it consists of a chlorine-containing or bromine-containing resin. The adhesion layers 12 are gas-bubble free and, in the exemplary embodiment, consist of acrylate adhesive, with a thickness of 23 μm, preferred layer thicknesses lying between 1 μm and 40 μm. (If appropriate, the adhesion layers can be dispensed with if the layer containing the molecules that change the refractive index has adhesive properties.) In the exemplary embodiment, the data storage medium D has twenty plies 10 of the coated polymer film 11 and an external diameter of about 30 mm. The height of the wound cylinder is 19 mm. Another number of plies 10 or other dimensions are likewise possible. The number of windings of plies 10 can, for example, lie between ten and thirty, but can also be greater than thirty.

The writing and reading device S arranged in the interior of the winding core contains a writing and reading head 20 which, with the aid of a mechanism 21, can be rotated in the directions of the arrows shown and can be moved axially to and fro. The writing and reading head 20 has optical elements with the aid of which a light beam generated by a laser not shown in FIG. 2 (for example at a wavelength of 630 nm or 532 nm) can be focused onto the individual plies 10 of the coated polymer film 11. Since the writing and reading head 20 is moved with the aid of the mechanism 21, it is able to scan all the plies 10 of the data storage medium D completely. In the exemplary embodiment, the data storage medium D is stationary at the time. It therefore does not need to be balanced with regard to a high rotational speed (and therefore does not need to be unwound or spooled to and fro either), as opposed to the writing and reading head 20. For clarity, the elements provided to balance the writing and reading head 20 are not shown in FIG. 2. The aforementioned laser is located outside the writing and reading head 20 and is stationary; the laser beam is deflected into the writing and reading head 20 by optical elements.

In order to store or write information in the data storage medium D, the laser in the exemplary embodiment is operated with a beam power of about 1 mW. In this case, the laser beam serves as a write beam and is focused onto a preselected ply 10 of the coated polymer film 11, so that the beam spot is smaller than 1 μm, the light energy being introduced in the form of short pulses of about 10 μs duration. The energy of the write beam is absorbed in the beam spot, which leads to local heating of the polymer film 11 and the layer applied thereto having molecules that change the refractive index, and therefore to the molecules that change the refractive index diffusing into the polymer film 11. As a result, the refractive index and the reflectivity change locally. During the writing operation, the write beam is defocused in the plies adjacent to the ply 10 of the coated polymer film 11 considered, so that the adjacent plies of the coated polymer film 11 are locally heated only slightly, and its stored information is not changed there.

In order to read stored information from the data storage medium D, the laser is operated in the continuous wave mode (CW mode). Depending on the stored information, the read beam focused onto the desired location is reflected, and the intensity of the reflected beam is registered by a detector in the writing and reading device S.

The data storage medium may also be of an embodiment which cannot be written by the user. In this case, it contains information units written by the manufacturer. A write function in the data drive belonging to the user is then superfluous.

What is claimed is:

1. A method of writing information in a data storage medium comprising an optical information medium which has a polymer carrier, the method comprising introducing atoms and/or molecules that change the refractive index into the polymer carrier, at locations associated with individual information units, as a function of the information to be entered.

2. The method as claimed in claim 1, wherein the atoms and/or molecules that change the refractive index are diffused into the polymer carrier.

3. The method as claimed in claim 2, wherein the atoms and/or molecules that change the refractive index originate from a layer which is formed on the polymer carrier.

4. The method as claimed in claim 3, further comprising removing the remaining portions of the layer from the polymer carrier after the information has been entered.

5. The method as claimed in claim 2, wherein the information to be entered is entered by means irradiation with infrared light.

6. The method as claimed in claim 1, wherein the atoms and/or molecules that change the refractive index are implanted into the polymer carrier by means of particle beams.

7. The method as claimed in claim 1, wherein the information to be entered is entered by means of a focused write beam.

8. The method as claimed in claim 1, wherein the information to be entered is entered over a large area, using a mask.

9. The method as claimed in claim 1, wherein highly polarizable molecules are used as the atoms and/or molecules that change the refractive index.

10. The method as claimed in claim 9, wherein halogen-containing molecules are used as the highly polarized molecules.

11. The method as claimed in claim 9, wherein aromatic molecules are used as the highly polarizable molecules.

12. The method as claimed in claim 1, wherein slightly polarizable molecules are used as the atoms and/or molecules that change the refractive index.

13. A data storage medium, comprising an optical information medium with entered information, which has a polymer carrier, the polymer carrier containing atoms and/or molecules that change the refractive index, at locations associated with individual information units, as a function of the entered information.

14. The data storage medium as claimed in claim 13, wherein the atoms and/or molecules that change the refractive index comprise highly polarizable molecules.

15. The data storage medium as claimed in claim 14 wherein the highly polarized molecules comprise halogen-containing molecules.

16. The data storage medium as claimed in claim 14, wherein the highly polarizable molecules comprise aromatic molecules.

17. The data storage medium as claimed in claim 13, wherein the atoms and/or molecules that change the refractive index comprise slightly polarizable molecules.

18. The data storage medium as claimed in claim 13, wherein the information medium has a plurality of polymer carrier plies, through which information units can be read from a preselected polymer ply and, if appropriate, can be written to a preselected polymer carrier ply.

19. The data storage medium as claimed in claim 18, wherein an adhesion layer is in each case arranged between adjacent polymer carrier plies.

20. The data storage medium as claimed in claim 19, wherein the refractive index of the adhesion layer differs only slightly from refractive index of the polymer carrier.

21. The data storage medium as claimed in claim 13, wherein the polymer carrier comprises a polymer film.

22. The data storage medium as claimed in claim 21, wherein the information medium is wound spirally.

23. The data storage medium as claimed in claim 22, which comprises an optically transparent winding core which has a recess in its central area.

24. The use of a data storage medium as claimed in claim 23 in a drive which is tuned thereto and has a reading device and, optionally, a writing device, the reading device and the optional writing device being arranged in the recess in the central area of the winding core, and, in order to read or write information being moved relative to the data storage medium while the data storage medium is stationary.

25. A data storage medium, comprising an optical information medium, which has a polymer carrier, the polymer carrier being provided with a layer which contains atoms and/or molecules that change the refractive index and which can be diffused into the polymer carrier by means of local heating.

26. The data storage medium as claimed in claim 25, wherein the layer is assigned an absorber which is set up to absorb a write beam, at least partially, and to locally discharge the heat produced thereby at least partially to the layer and/or the polymer carrier.

27. A data storage method comprising:
providing an optical information medium comprising a polymer carrier, and
storing data by changing the optical properties of the polymer carrier, wherein the optical properties are changed by selectively introducing atoms and/or molecules into the polymer carrier.

28. The method as claimed in claim 27, wherein the atoms and/or molecules are introduced into the polymer carrier from a layer formed on the polymer carrier.

29. The method as claimed in claim 28, wherein the layer formed on the polymer carrier is selectively heated to introduce the atoms and/or molecules into the polymer carrier by diffusion.

30. The method as claimed in claim 28, further comprising: removing the layer formed on the polymer carrier after the storing of the data.

* * * * *